United States Patent [19]

Hove et al.

[11] Patent Number: 5,106,247
[45] Date of Patent: Apr. 21, 1992

[54] AUTOMATIC LOCKING SYSTEM

[76] Inventors: Johan Hove, Lovstaborg, Karsta, 186 96 Vallentuna, Sweden; Robert Cowen, 18 West End, Wolsingham, BL13 3AY, County Durham, England

[21] Appl. No.: 564,826

[22] Filed: Aug. 9, 1990

[51] Int. Cl.⁵ .............................. B63B 25/28
[52] U.S. Cl. ........................ 410/73; 410/77; 410/90
[58] Field of Search ............ 410/69, 70, 72, 73, 410/77, 83, 86, 90, 91

[56] References Cited

U.S. PATENT DOCUMENTS

| | | | |
|---|---|---|---|
| 3,604,363 | 9/1971 | Smith | 410/70 |
| 3,667,401 | 6/1972 | Sckwiebert et al. | 410/70 |
| 3,753,591 | 8/1973 | Pratt . | |
| 3,774,551 | 11/1973 | Sweger . | |
| 4,092,040 | 5/1978 | Tatina . | |
| 4,236,853 | 12/1980 | Niggemeier et al. | 410/77 X |
| 4,382,734 | 5/1983 | Synowiel et al. | 410/70 |
| 4,430,032 | 2/1984 | Morgan . | |
| 4,507,032 | 3/1985 | Rosaia | 410/83 |
| 4,626,155 | 12/1986 | Hlinsky et al. | 410/69 X |
| 4,776,736 | 10/1988 | Tatina . | |

Primary Examiner—Robert J. Spar
Assistant Examiner—Craig Slavin
Attorney, Agent, or Firm—Browdy and Neimark

[57] ABSTRACT

An automatic hold down and locking as well as automatic load configuration change capability device system, which can be used to hold down and lock either one long container or several shorter containers within the same loading space, regardless of the outside width or width of bottom side rail flange on the container. The locking device system has four fixed non-retractable fully automatic locking devices positioned on the load carrier at the four outer standard locking points of each long container, and at least two retractable fully automatic locking devices positioned at the long side of the load carrier between and in line with the outer locking points.

8 Claims, 10 Drawing Sheets

AUTOMATIC LOCKING SYSTEM

FIELD OF THE INVENTION

The present invention relates to hold down and locking devices for cargo containers and more particularly a fully automatic hold down device system capable of holding down either one or simultaneously several containers on load carriers, such as railway cars or road trailers. The container is automatically locked to the carrier just by lowering the container down over the locking housings. The system also adjusts itself automatically with respect to the number of locking housing required on a standard 40 foot point loading space. E.g. for two 20 foot containers 8 locks are required but for one container 40 foot or longer with 40 foot locking points, only the 4 outer end locks are required.

DESCRIPTION OF PRIOR ART

Hold down devices for securing containers to flat beds on both rail and road load carriers, are well known in the art. One example is the pedestal lock with an automatic latch as illustrated in U.S. Pat. Nos. 4,430,032 and 3,774,551. These can however only lock containers with one standard width.

A development of the pedestal lock came about when the need to lock containers with different outside widths became apparent. The width between the locking points on standard ISO type containers are kept constant even if the outside width is 8 foot or 8 foot 6 inches. This made it possible to move the latch from the pedestal to a locking spigot, that fitted into the bottom aperture of the corner casting of the container, making the latch lock to the inside to the corner casting, rather than outside it, see U.S. Pat. No. 4,092,040.

U.S. Pat. No. 4,776,736 shows a twin container hold down device that automatically retracts below deck level when the locks are not needed. The locks are manually operated for locking and unlocking.

The U.S. patent application Ser. No. 07/415,954 shows a hold down and locking device system which can be used to hold down and lock either one long container or simultaneously several shorter containers if the containers have wide side rails or flat outer floors so that the incorporated trigger pin can work.

U.S. Pat. No. 3,753,591 shows an automatic twin center lock to lock the adjacent ends of one or two 20 foot containers with two rigid spigots for positioning the containers through the bottom hole in the container corners and spring loaded latches that holds the container down from the outside of the end aperture of the container corner castings. The spigots are non-retractable but positioned about two inches below the imagined horizontal line between the non-retractable locks positioned at the outer 40 foot points, so that when one or two 20 foot containers are loaded, the adjacent ends of the 20 foot containers are positioned on the lower center locks and hence leaning downwards towards the center of the 40 foot space.

SUMMARY OF THE INVENTION

According to the present invention a fully automatic hold down and locking as well as fully automatic load configuration change capability device system becomes available, which can be used to hold down and lock either one long container or several shorter containers within the same loading space, regardless of the outside width or width of bottom side rail flange on the container. The system both locks and adjusts itself to handle different load configurations fully automatically without manual help other than the downward movement and weight of an empty or full container.

A locking device system comprises four fixed non-retractable fully automatic locking devices positioned on the load carrier at the four outer standard locking points of each long container, and at least two retractable fully automatic locking devices positioned at the long side of the load carrier between and in line with said outer locking points. All locks are positioned at the standard positions of the apertures of the containers, which, according to e.g. ISO standards must be available at the bottom of the container.

According to the invention, the loading surfaces of the retractable locking devices of the load carrier between the outer locking devices at the load carrier corners are lower than the loading surfaces of said outer locking devices.

The retractable locking devices comprising a spigot and a spring has a system of springs by which the spigot automatically can be retracted into the box, preferably to ¾ of its height. Said spring system together with the different heights of the loading surfaces facilitate to a large extent the previous very labor consuming loading and locking of containers and provides a means for loading containers of different lengths on the same loading carrier area.

One main problem when loading containers with a length of 20 foot or less on the same load carrier that is designated to also carry containers longer than 20 foot, has been that the non-retractable locking devices at the adjacent ends of the container shorter than 40 foot became an height obstacle for the longer containers.

The handling of containers on both rail and road has been extensive and increased during the past 25 years. The importance of safe and quickly operated locking devices has therefore been well known for some time in the trade. The fact that the standard type freight containers are now available in three outside widths, 8 foot, 2.5 m and 8 foot 6 inch, has made the popular pedestal lock or pedestal side support, unpractical to use. The pedestal locks can be manually moved longitudinally on the flat, to fit the desired loading requirements, depending on the size of containers to be loaded, but it cannot be moved transversally. To overcome the lack of width adaptabilty, the pedestals were in some cases replaced by spigot container locks with a built in automatic locking device. None of these were retractable so for the four 20 foot points in the centre of the 40 foot loading space, something else must be fitted. One way of solving this was to fit the twin container hold down, but then the locking had to be manually operated. Another way was to just fit side supports, two at each side of the loading space. The inner fitting for 8 foot width and the outer for 8 foot 6 inch width. However, both inner and outer side support had to be manually operated. They did not either offer any locking of the containers.

Another way was to fit the automatic twin center lock, as shown in U.S. Pat. No. 3,753,591 that does not have to retract to give space for the 40 foot or longer containers since the whole lock is placed below the horizontal line of the outer non-retractable locks. The locking of the containers is done by a spring loaded latch through the end hole of the container corner casting. The latch has a fixed position in the latch holder that is placed on the lock in the 3 inch clearance space that occurs between two 20 foot containers when the outer ends of the 20 foot containers are positioned on the four 40 foot container corners—the non-retractable locks. The latch engagement into the corner casting does therefore vary depending on how much the containers move longitudinally over the positioned spigots. The total tolerance of the positions of the corner casting on a container and the size tolerance of the bottom corner casting aperture is such that a container theoretically can slide maximum 0.826" (21 mm) when positioned on the spigots welded onto the load carrier. The disadvantage with the twin center lock is therefore that the physical engagement of the hold down latch into the aperture on the corner casting could vary so much that it cannot meet the ¾" requirements stipulated in paragraph 2,E.4 of AAR specification M-952-88 under the most adverse tolerance condition.

Another disadvantage with the twin center lock is that when considering maximum downward floor flexing of a fully loaded 40 foot container (0.59" or 15 mm under the bottom surface of the corner castings), the height distance between the top of the twin center lock and the load surface of the outer locks, needs to be extended with this tolerance. The only way to achieve this is to lower the twin center lock with 0.59" in relation to the load surfaces on the outer locks and hence increase the height difference between the load surfaces on the twin center locks and the outer locks and increase the loading angle of the 20 foot container.

If the height difference is 2.59" from one end of a 20 foot container to the other, the nominal distance between the top corner castings on two adjacent 9.5 foot high container will be reduced from 3 inch with 2×1.285" to 0.43 inch (10.9 mm). If one container has plus tolerances and the other minus tolerances on the position of the corner castings, the remaining distance on 0.43 inch is not enough to allow shunting movements to be taken up by each containers four locks, since the containers will make contact at the top corners and one will be pushing the other. The fact that the containers could stand in contact at the top corner castings when being unloaded, could prevent the use of top corner spreader lifting equipment if the equipment has positioning brackets or guides.

The present invention provides a solution to all these problems. The locking device according to the invention is fully automatic and hence providing both locking and load configuration changes without any manual ground assistance. The weight of the empty or full container is enough to engage the lock.

DESCRIPTION OF THE PREFERRED EMBODIMENTS

Figure 1:
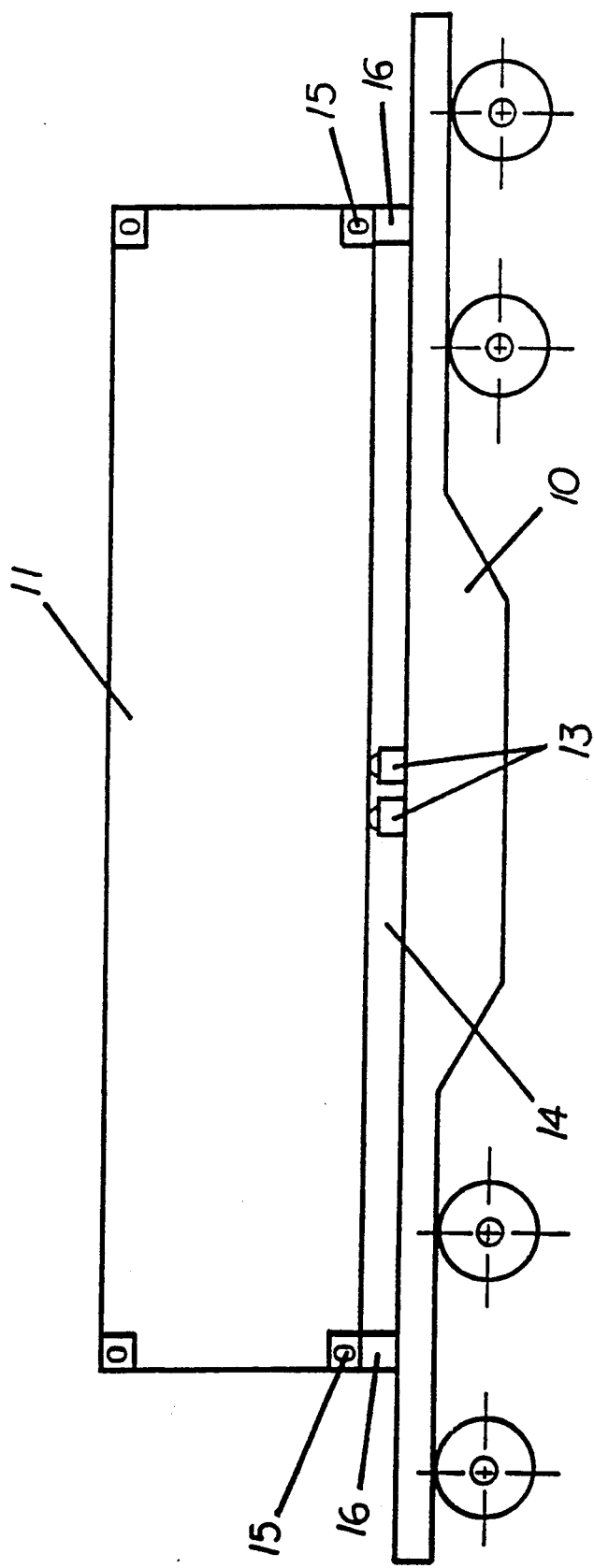
FIG. 1 is a side view of a container flat car 10 being a typical load carrier loaded with a long container 11 locked via corner casting apertures 15 to non-retractable locking devices 16 at each corner of the load carrier and with the retractable locking devices 13 at the long side of the load carrier in a retracted position. The loading surfaces of the retractable locking devices 13 are below the loading surfaces of the non-retractable locks 16.
Figure 2:
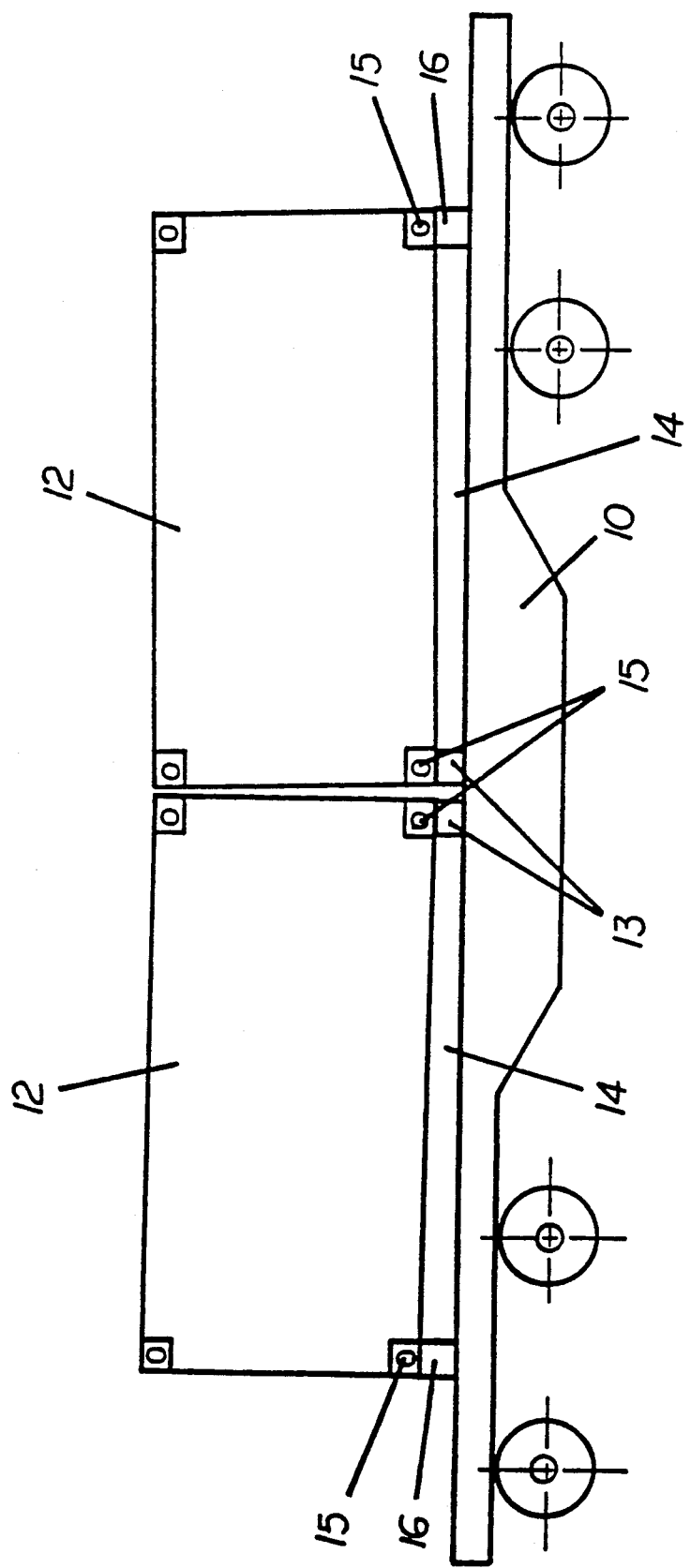
FIG. 2 is a side view of a container flat car 10 loaded with two shorter containers 12 locked to the non-retractable locking devices 16 at each outer corner of the load carrier and at the retractable locking devices 13 at each side of the car. The short containers are inclining due to the different heights of the loading surfaces of the locks 13 and 16 respectively.

FIG. 1 and FIG. 2 are side views of a container load carrier 10 such as a railway flat car. The load carrier is rated to carry freight containers up to a certain weight and volume. The load carrier of FIG. 1 and FIG. 2 are designated to carry either one 40 foot or longer container 11 (FIG. 1) or two shorter containers 12 (FIG. 2)—each 20 foot. The load carrier is provided with a container locking device system that automatically keeps the container(s) locked in position towards the load carrier flat bed at each container corner during transportation, regardless if one or two container(s) are loaded and regardless if the container width is 8 foot or 8.5 foot. With the locking device 13 according to the invention there is no need of any manual adjustments to the device prior to or after loading of the containers on the load carrier. If desired, the device can provide simultaneously a 6 inch gripper space 14 between the load carrier floor and the bottom of the container. In FIG. 1 the automatic retractable locking device 13 according to the invention is shown in retracted position when the load carrier is loaded with one 40 foot container. The two 20 foot containers of FIG. 2 are locked to the load carrier by the automatic locking device 13 according to the invention. 15 in FIGS. 1 and 2 shows the corner casting apertures.

Figure 3:
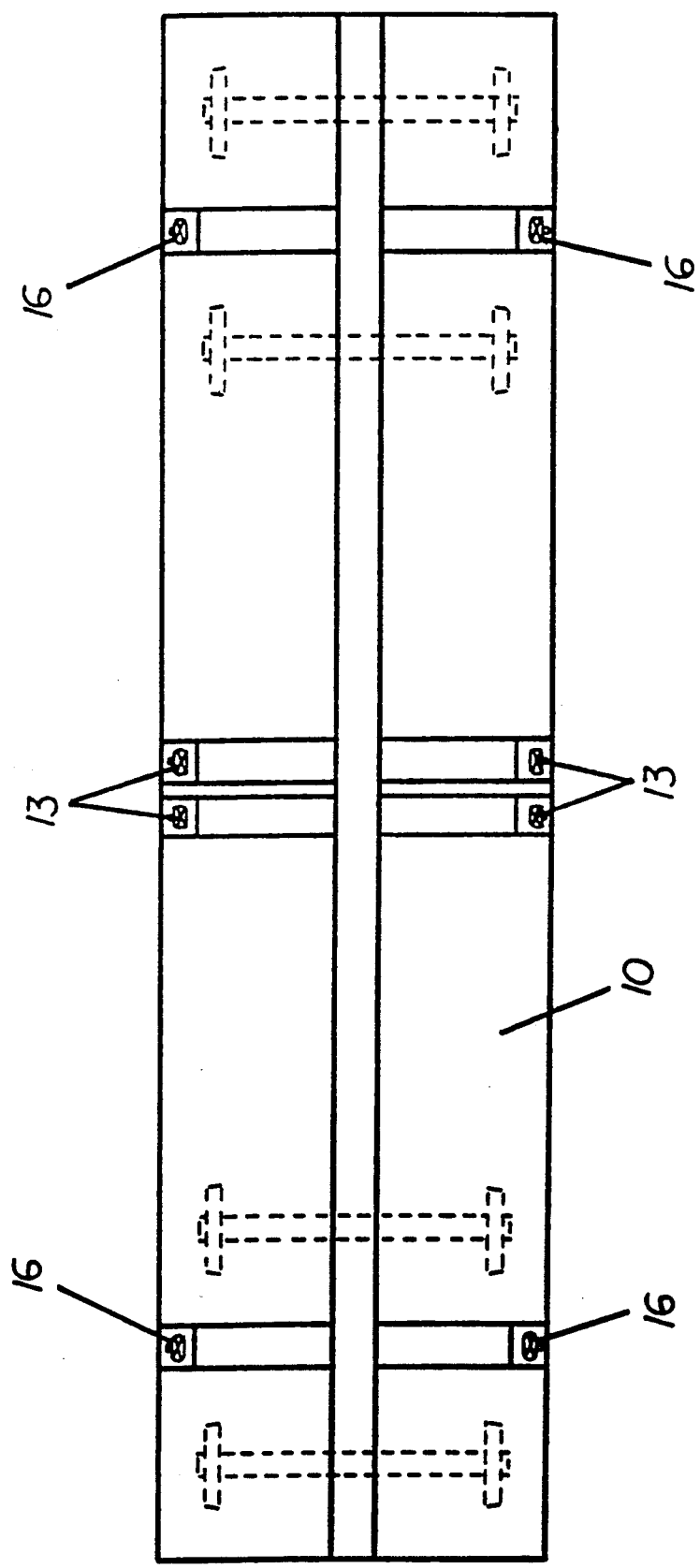
FIG. 3 is a top view of the non-loaded car 10 with the non-retractable locking devices 16 at the outer ends of the load carrier and the retractable locking devices 13 at each side in the centre between the non-retractable locking devices 16.

FIG. 3 is a plan view of the load carrier with the retractable locking device shown as 13 and the non-retractable locking device according to prior art shown as 16.

Figure 4:
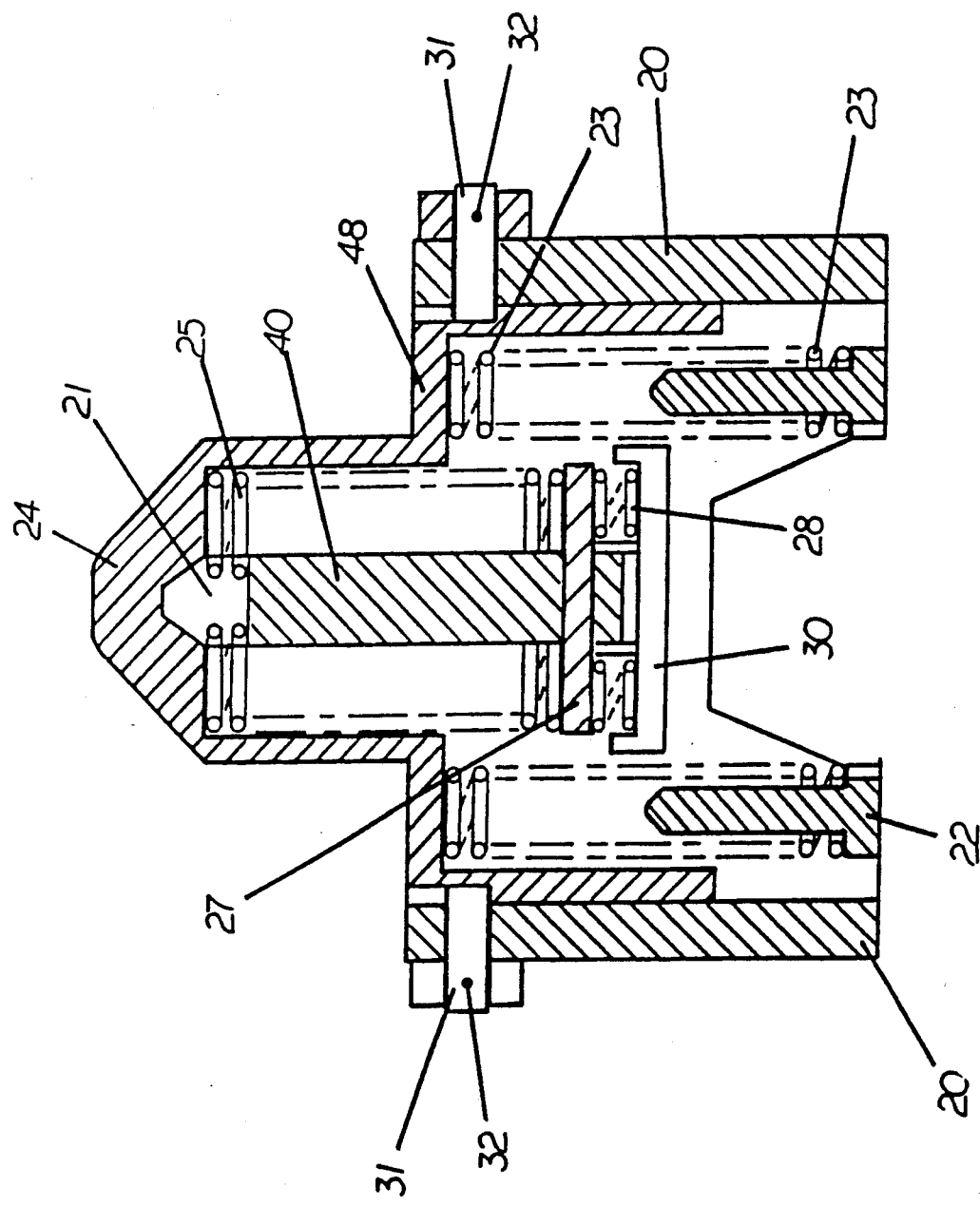
FIG. 4 is a sectional view of the retractable locking device 13 comprising the box 20 and retractable spigot 21.
Figure 5:
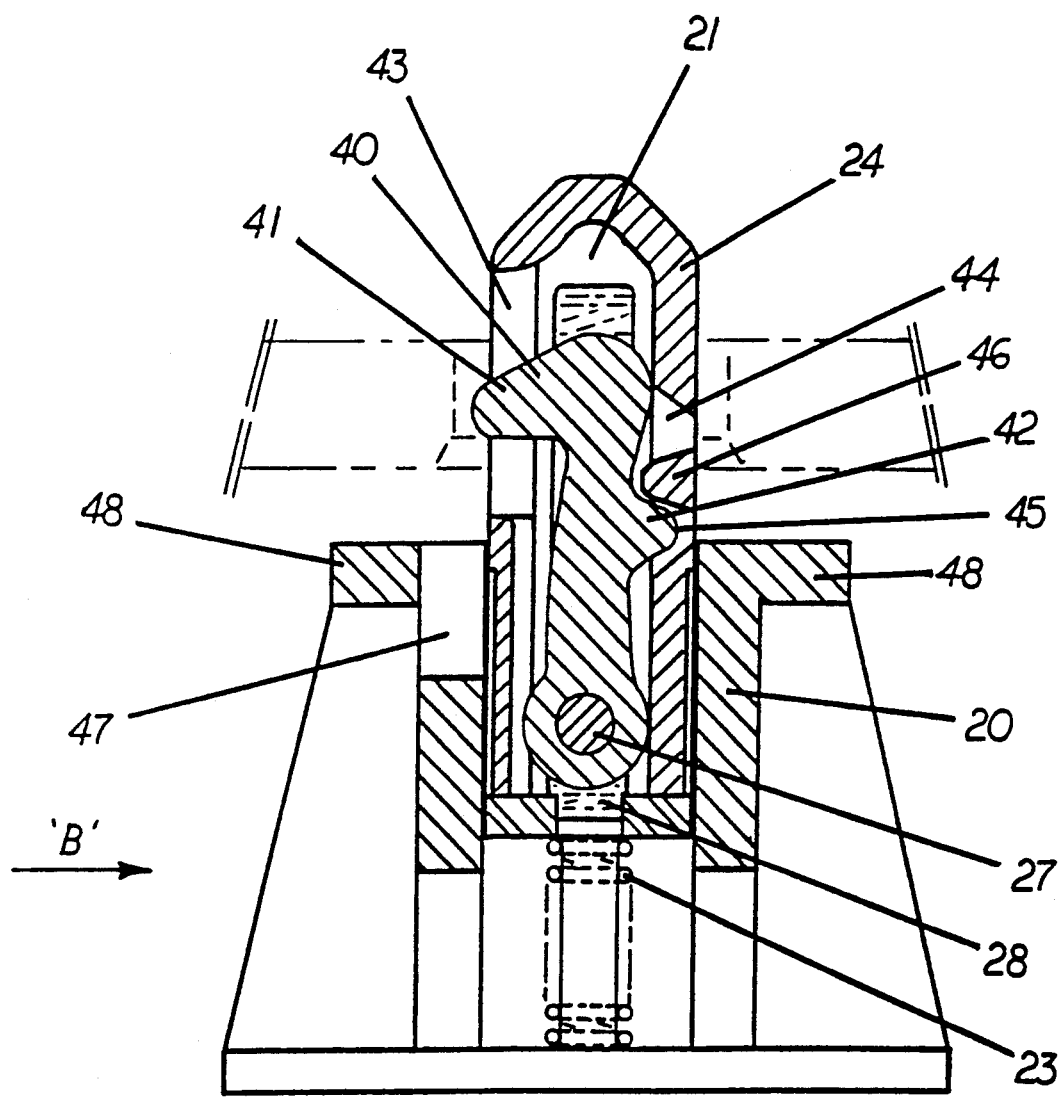
FIG. 5 is a sectional view of the retractable locking device 13 when the container corner is being loaded onto the locking spigot 21.

FIG. 4 shows a sectional view of the retractable locking device 13 according to the invention. At the bottom of the box 20 two guiding pins 22 are arranged in a vertical position in relation to the bottom of the box to keep the retraction springs 23 in an upright position and to keep the locking spigot 21 in an erected and a locked position when the load carrier is loaded with a container having to the spigot corresponding corner casting apertures. It also provides a possibility for the spigot to retract into the box when the load carrier is loaded with a long container lacking corresponding casting apertures at the place of the locking device.

Figure 6:
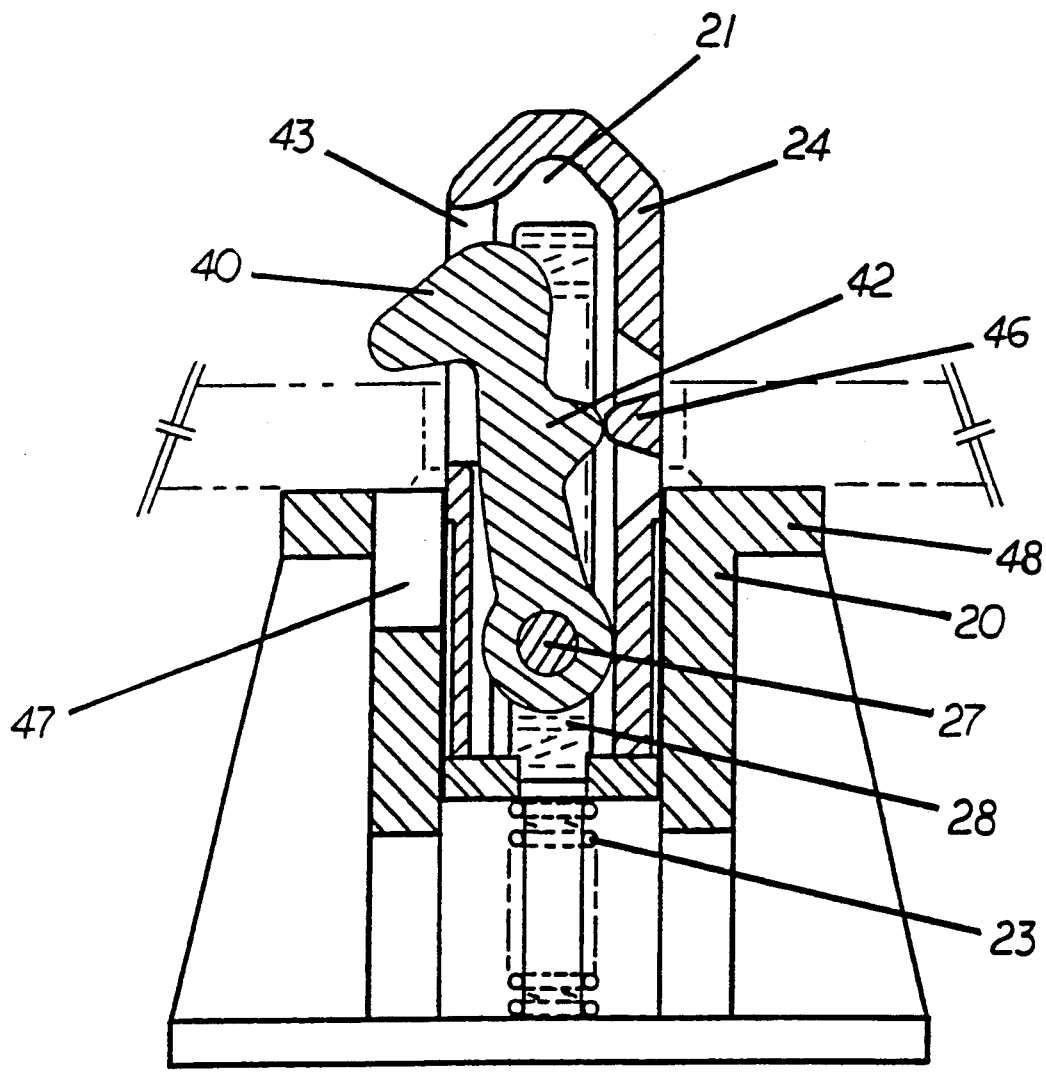
FIG. 6 is a sectional side view of the retractable locking spigot 21 when the container corner is loaded and locked into place on the spigot load surface.

The locking spigot 21 consists of a spigot housing 24 provided with two hook lock springs 25 which render it possible in combination with hook cam 42, house cam 46, and openings 44, 45 to retract the hook 40 via the spring retainer 27 into the housing and also the hook 40 to grip the edge of the corner casting apertures when loading and unloading the container. The spring retainer rod 27 is attached to the hook 40 via a hole at the bottom of the hook and the hook lock springs 25 placed into fitting cavities in the housing at each side of the hook on the top of the spring retainer. Two hook lifting springs 28 are positioned under the spring retainer rod 27 which makes it possible for hook 40 to protrude out of the spigot housing into a locked position on the corner casting by forcing hook 40 upward and out around spring retainer rod 27 when hook cam 42 engages house cam 46 as hook 40 passes through the aperture of the corner casting as shown in FIG. 6. The hook lifting springs 28 are kept in position against a spring retainer rod 27 by seats such as in this case two bars 30 at the bottom of the spigot. The spigot 21 is prevented from jumping out of the box 20 by bolts 31 one at each end of the box 20 through the end plates of the box securing the spigot 21 over the top outer ends of the spigot in level with the loading surface.

FIGS. 5-7 and 9 are sectional side views of the locking spigot 21 with the locking hook 40, the housing 24, the box 20, the spring retainer 27 and the retraction springs 23.

As indicated above, the hook 40 is provided with a nose 41 at the top of the hook and a cam 42 at the back of the hook. The spring retainer 27 is inserted into a hole in the bottom of the hook.

The housing 24 is provided with a front-opening 43 for the hook-nose 41 which renders it possible for the hook 40 to grip the edge inside the corner casting aperture when the container is loaded (FIG. 6). Housing 24 also has two vertically aligned openings 44,45 at the back of the housing. When the container is being loaded onto the lock (FIG. 5) the hook cam 45 is forced down into the lower openings 45 by the downward movement of the corner casting against and passed hook nose 41 so that the container corner casting can pass down to the loading surface 47. When fully loaded, the hook is forced upwards by the hook lifting spring 28 and as cam 42 engages the house cam 46 and forces the top end of the hook 40 with its nose 41 to enter into the container corner casting and grip the edge to hold down the container (FIG. 6).

Figure 7:
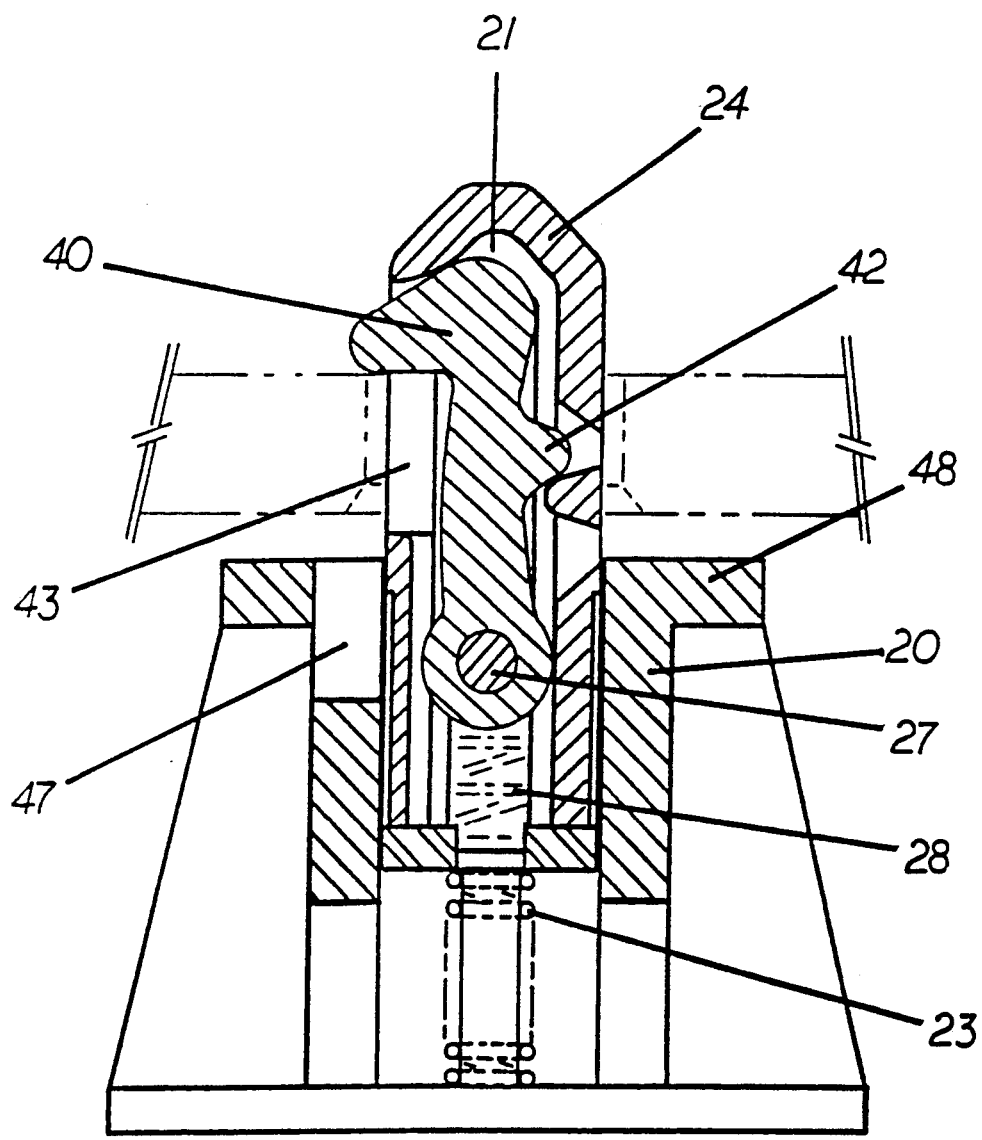
FIG. 7 is a sectional side view of the retractable locking spigot 21 showing the container corner being unloaded off the lock.
Figure 8:
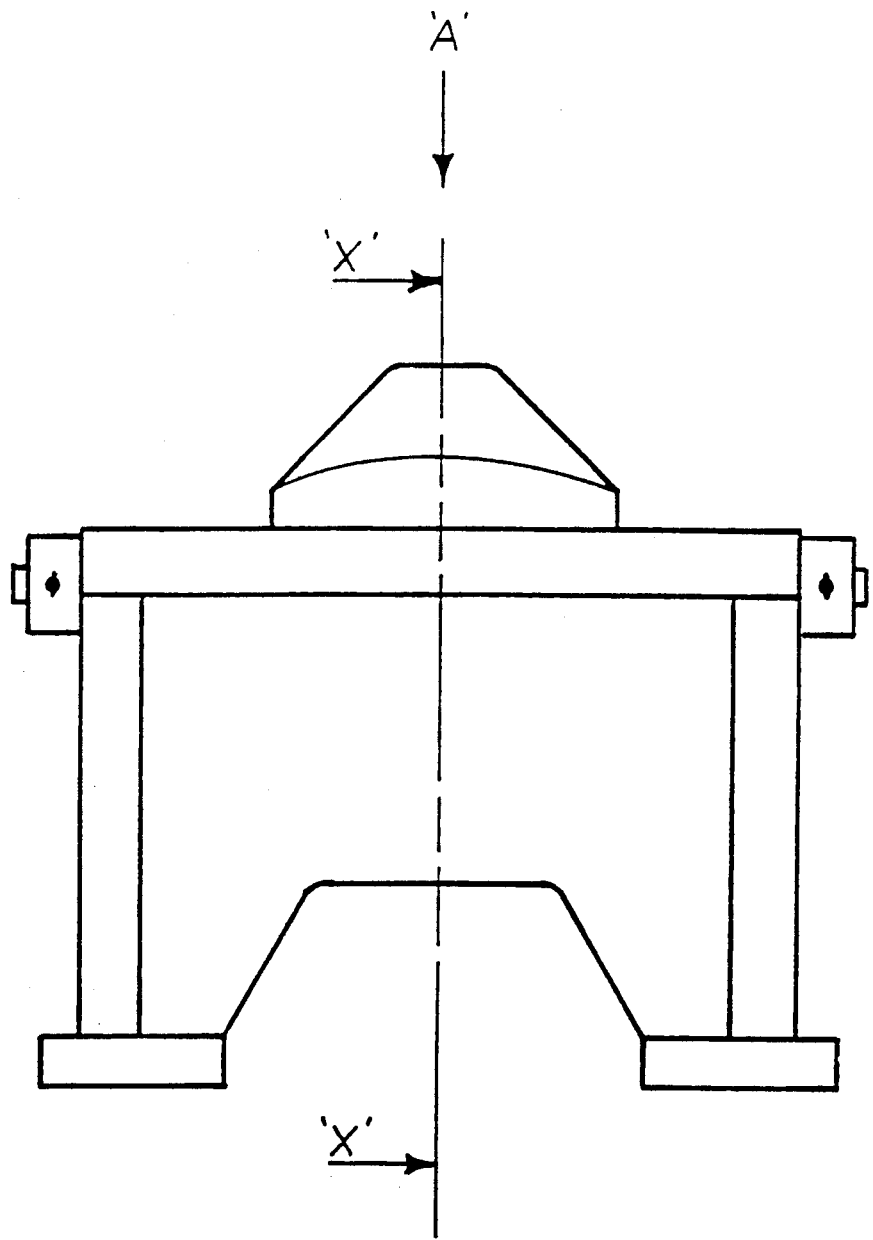
FIG. 8 is an elevation view showing the locking device 13 of FIG. 4 in retracted position.
Figure 9:
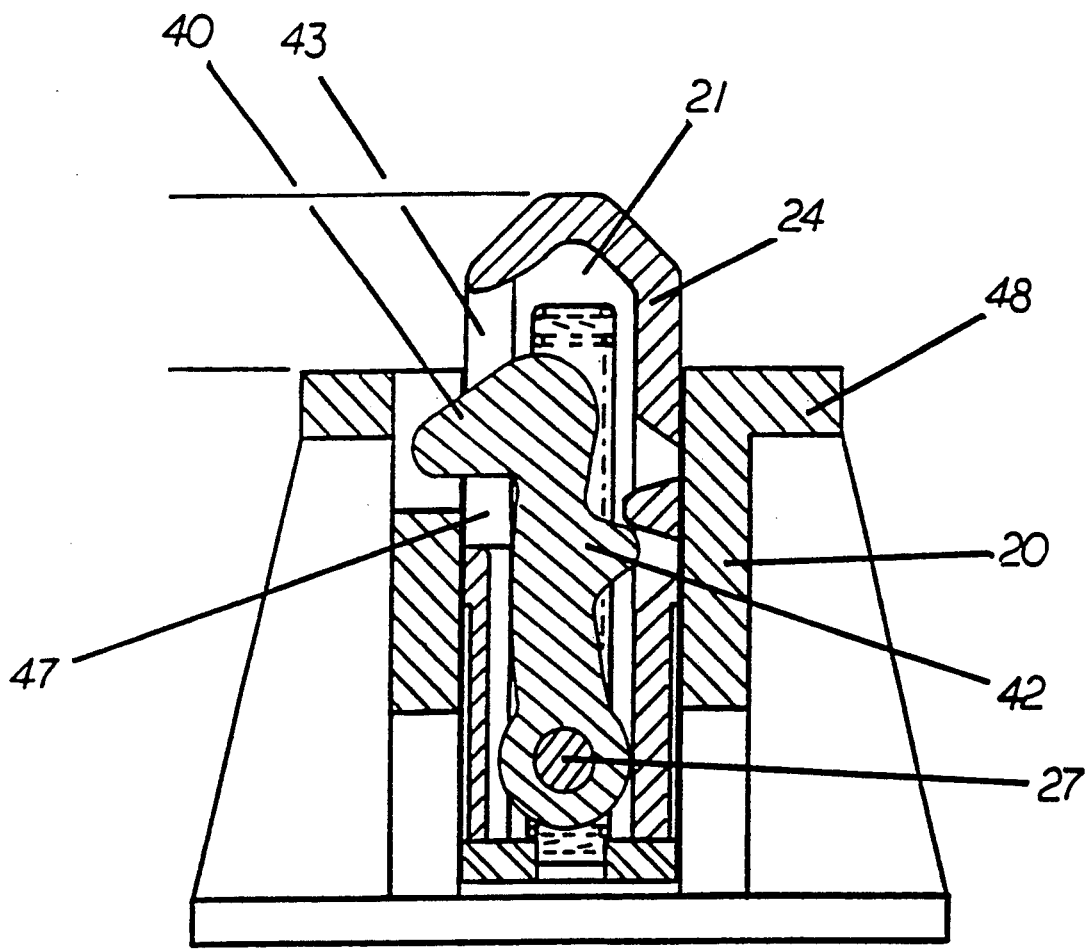
FIG. 9 is a sectional view of the locking spigot 21 retracted into the box 20.
Figure 10:
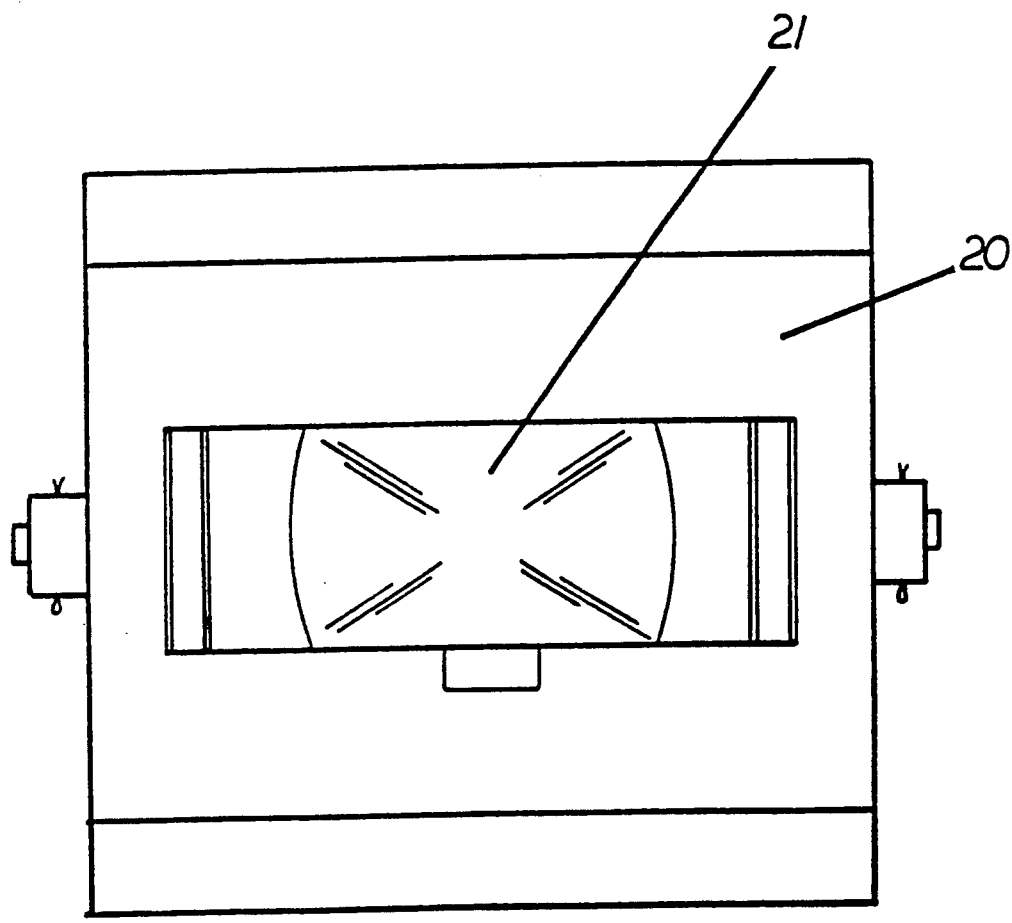
FIG. 10 is a view showing how the locking spigot 21 is prevented from jumping out of the box by insertion of bolts at each end side and over the top outer ends of the locking spigot and through the end plates of the box.

FIG. 7 is shows the lock being unloaded by lifting the container upwards. The container casting forces the hook 40 to be lifted upwards and due to the spring retainer rod 27, the hook lock spring 25 will be compressed and give the hook and lock a predetermined disengagement force before the shape of the hook nose 41 and the corner casting lifting motion forces the hook 40 inwards so that cam 45 enters into cam hole 44 so that the hook will release the grip on the corner casting and be fully unloaded.

It is shown in FIGS. 5, 6, 7, and 9 that the box is provided with a cut-out section 47 for the hook nose when the lock is retracted.

The locking device system consists typically of four fixed non-retractable locks positioned at the outer 40 foot points, two at each end of the load carrier and four retractable locks mounted two and two and positioned at the center of the 40 foot space where the adjacent ends of two 20 foot containers meet. The lock protrudes about 4.15 inch above the loading surface 48 of the box. The force required to retract the locks is not exceeding 400 lbs per lock. The lock can only be retracted 2.75 inch into the box 20 and at this position the lock only protrudes about 1.4 inch above the top surface 48 of the box which is the same surface that the container corner casting on the adjacent sides of the 20 foot containers are resting on when loaded. The load surfaces on the outer non-retractable locks are 2 inch higher than the load surfaces on the retractable boxes 20. When the locks in the boxes are fully retracted, the top of the locks will be at least 0.6 inch below the horizontal line drawn from the load surface height on the outer locks at each end of the 40 foot loading space. This means that a fully loaded 40 foot container can be allowed to flex downwards when loaded on the rail load carrier to the maximum tolerance of 0.59 inch, without making contact with the center locks.

When a 20 foot container is loaded it does not matter if the two retractable locks are retracted to some extent or even retracted fully, since it is still possible to position the 20 foot container even when the locks are retracted, because they still protrude 1.4 inch over the loading surface 48 on the box 20. When the container finally is positioned over the four locks, the two center locks will be pushed up and lock into the corner castings on the 20 foot container by the springs 23 in the box 20, since this force is about four times as strong as the force needed to engage the locks and hence hold down the container to the load carrier.

The maximum height difference of 2 inch on outer and center loading height surfaces for the 20 foot container, is within the limit of what can be accepted without the top corner castings on 9.5 foot high containers would make physical contact at the most adverse tolerance conditions. From the nominal 3 inch (76.2 mm) distance between the adjacent ends of the two 20 foot containers we have to subtract $$\frac{114'' \text{ (height)}}{230.43'' \text{ (length)}} \times 2 \text{ (height diff.)} = 0.989''$$

per container = 1.978" per adjacent end at the top of the corner casting. We also have to subtract the maximum movement of the container over the spigots. This is 21 mm per container but since the containers always would move in the same direction when the load carrier is being shunted or impacted, the effect on the space will not exceed 21 mm or 0.827". Of the original 3 inch play it therefore remains 0.195 inch or 5 mm play between the top corner castings at the most adverse tolerance condition.

As said above, the locking device system consists typically of eight locks, four outer non-retractable and four retractable center locks. Each of these eight locks are able to lock and hold down the loaded container or containers through the bottom corner castings with a disengagement force of minimum 1600 lbs and maximum 2200 lbs and an engagement force of maximum 200 lbs.

From the foregoing description it will be apparent that the locking device system as described permits a means of convenient loading and automatic locking of containers of different length on load carriers.

What we claim is:

1. A retractable locking device to position and lock a cargo container to a loading deck of vehicular load carrier, said cargo container having an aperture plate at selected positions on said cargo container, said aperture plate engageable on an upper surface through an opening in said plate by said locking device, said locking device comprising, a spigot housing retractably engaged in a box fixed to said load carrier, an opening in the front of said spigot housing, a first set of spring means for biasing said spigot housing above said deck of said load carrier and permitting said spigot housing to retract down into said deck by loading a cargo container without said aperture plate, gripping hook means retractably and rotatably retained in said spigot housing for engaging and disengaging said upper surface of said aperture plate means through said opening in the front of said spigot housing, a second set of spring means located in said spigot housing for biasing said gripping hook means downwardly in said spigot housing and holding said gripping hook means in engagement with said upper surface of said aperture plate, a third set of spring means located below said gripping hook means and said second set of spring means for biasing said gripping hook means upwardly and rotatably out or said opening in the front of said housing spigot into engagement with said upper surface of said aperture plate, wherein, when said container is loaded onto said deck into engagement with said housing spigot, said spigot housing protrudes through said opening in said aperture plate and said gripping hook means is forced through said opening in said aperture plate and out through said opening in said spigot housing into engagement with said upper surface of said aperture plate, and when said container is unloaded from said deck said gripping hook is forced through said opening in said aperture plate and back into said spigot housing.

2. The locking device according to claim 1, wherein said spigot housing is retractable into said deck to ¾ of its height.

3. The locking device according to claim 1, wherein said box has vertical guide pins at a bottom of said box to maintain said first set of spring means upright beneath said spigot housing.

4. The locking device according to claim 3 further comprising, spring seats engaging said third set of spring means at a bottom of said spigot housing.

5. The locking device according to claim 1, further comprising, lift stop means for preventing said spigot housing from being retracted from said box, said lift stop means comprising a bolt engaging said spigot housing through each end of said box at a level of said loading deck.

6. The locking device according to claim 1, wherein said gripping hook means comprises, a vertical member, a convex hook nose at a front top end of said vertical member for engaging said aperture plate, a retaining rod at a bottom end of said vertical member engaged to said third set of spring means, a cam on a back of said vertical member, an upper and a lower opening vertically aligned on a back of said spigot housing corresponding to said cam, and a ridge on a back of said spigot housing between said upper and lower opening.

7. The locking device according to claim 6, wherein, when said container is loaded onto said deck into engagement with said spigot housing said aperture plate first engages said convex hook nose and forces said cam into engagement with said lower opening and as said aperture plate moves down passed said convex hook nose said cam rides up out of said lower opening onto said ridge through the force exerted by said third set of spring means whereby said convex hook nose engages said upper surface of said aperture plate.

8. The locking device according to claim 6, wherein when said container is unloaded from said deck said convex hook nose is moved up by said aperture plate and drives said cam into engagement with said upper opening thereby permitting disengagement of said aperture plate from said convex hook nose and resulting in said second set of springs forcing said cam out of said upper opening over said ridge into lower opening where said locking device is ready to be re-engaged.

* * * * *